(12) United States Patent
Aronovich et al.

(10) Patent No.: US 10,938,901 B2
(45) Date of Patent: Mar. 2, 2021

(54) MANAGEMENT AND UTILIZATION OF DATA VOLUMES IN A CONVERGED SYSTEM

(71) Applicant: International Business Machines Corporation, Armonk, NY (US)

(72) Inventors: Lior Aronovich, Thornhill (CA); Shijie Che, Toronto (CA); Jordan J. Keon, Aurora (CA); Ting Xue, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/404,096

(22) Filed: Jan. 11, 2017

(65) Prior Publication Data

US 2018/0198861 A1 Jul. 12, 2018

(51) Int. Cl.
*G06F 16/22* (2019.01)
*H04L 29/08* (2006.01)
*H04L 12/24* (2006.01)

(52) U.S. Cl.
CPC ...... *H04L 67/1097* (2013.01); *G06F 16/2246* (2019.01); *G06F 16/2272* (2019.01); *H04L 41/0896* (2013.01); *H04L 67/306* (2013.01); *H04L 67/06* (2013.01)

(58) Field of Classification Search
CPC .................................................. G06F 17/30327
USPC .......................................................... 707/812
See application file for complete search history.

(56) References Cited

U.S. PATENT DOCUMENTS

| 5,692,128 A | 11/1997 | Bolles et al. |
|---|---|---|
| 5,950,198 A | 9/1999 | Falls et al. |
| 6,757,695 B1 | 6/2004 | Noveck et al. |
| 7,089,359 B2 * | 8/2006 | Kaneda ................. G06F 3/0605 711/117 |
| 8,478,836 B1 * | 7/2013 | Chang ................. H04L 67/1091 709/203 |
| 8,949,939 B2 | 2/2015 | Peddada |
| 9,244,720 B2 | 1/2016 | Datla et al. |
| 9,342,349 B2 | 5/2016 | Nandyalam et al. |
| 9,348,627 B1 | 5/2016 | Palekar et al. |
| 9,369,344 B2 | 6/2016 | Datla et al. |
| 9,479,585 B1 | 10/2016 | Jobanputra et al. |
| 10,009,426 B2 * | 6/2018 | Sarisky ............... H04L 67/1097 |
| 10,768,986 B2 | 9/2020 | Aronovich et al. |

(Continued)

FOREIGN PATENT DOCUMENTS

| WO | 2016041998 A1 | 3/2016 |
|---|---|---|
| WO | 2016080953 A1 | 5/2016 |

OTHER PUBLICATIONS

Aronovich et al., U.S. Appl. No. 15/400,741, filed Jan. 6, 2017.
(Continued)

*Primary Examiner* — Alford W Kindred
*Assistant Examiner* — Allen S Lin
(74) *Attorney, Agent, or Firm* — Zilka-Kotab, P.C.

(57) ABSTRACT

A computer-implemented method according to one embodiment includes identifying a request to create a consumer within a converged system, defining the consumer within a hierarchy of consumers, where the consumer represents a function in an organization, setting a storage capacity attribute for the consumer, and conditionally defining a data volume for the consumer, based at least in part on the storage capacity attribute.

17 Claims, 12 Drawing Sheets

(56) References Cited

U.S. PATENT DOCUMENTS

| | | | |
|---|---|---|---|
| 10,824,355 B2 | 11/2020 | Ahmed et al. | |
| 2003/0142552 A1 | 7/2003 | Green | |
| 2004/0090026 A1 | 5/2004 | Ball | |
| 2005/0183143 A1 | 8/2005 | Anderholm et al. | |
| 2007/0214497 A1* | 9/2007 | Montgomery | G06F 21/6218 726/4 |
| 2008/0010243 A1* | 1/2008 | Weissman | G06F 16/2455 |
| 2008/0126547 A1 | 5/2008 | Waldspurger | |
| 2009/0192362 A1* | 7/2009 | Sweeney | G16H 50/80 600/300 |
| 2009/0288084 A1 | 11/2009 | Astete et al. | |
| 2012/0042114 A1 | 2/2012 | Young et al. | |
| 2012/0166751 A1 | 6/2012 | Matsumoto et al. | |
| 2012/0317129 A1* | 12/2012 | Qayyum | G06F 21/6227 707/754 |
| 2013/0046906 A1 | 2/2013 | Ripberger | |
| 2013/0073819 A1 | 3/2013 | Havewala et al. | |
| 2013/0086578 A1 | 4/2013 | Eilam et al. | |
| 2013/0155882 A1 | 6/2013 | Pendleton et al. | |
| 2013/0297902 A1 | 11/2013 | Collins et al. | |
| 2013/0311986 A1 | 11/2013 | Arrouye et al. | |
| 2014/0109097 A1 | 4/2014 | Datla et al. | |
| 2014/0189128 A1 | 7/2014 | Gu et al. | |
| 2014/0297742 A1* | 10/2014 | Lyren | H04L 65/403 709/204 |
| 2014/0380303 A1 | 12/2014 | Bello et al. | |
| 2014/0380307 A1 | 12/2014 | Zhu et al. | |
| 2015/0134903 A1 | 5/2015 | Goodman et al. | |
| 2015/0142939 A1 | 5/2015 | Petrick et al. | |
| 2015/0172117 A1 | 6/2015 | Dolinsky et al. | |
| 2015/0188840 A1 | 7/2015 | Xiao et al. | |
| 2015/0350102 A1 | 12/2015 | Leon-Garcia et al. | |
| 2016/0080495 A1 | 3/2016 | Bilas et al. | |
| 2016/0124885 A1 | 5/2016 | Vajravel | |
| 2016/0149766 A1 | 5/2016 | Borowiec et al. | |
| 2016/0162611 A1* | 6/2016 | Mardikar | G06F 17/5009 703/22 |
| 2016/0188370 A1 | 6/2016 | Razin et al. | |
| 2016/0188898 A1 | 6/2016 | Karinta et al. | |
| 2016/0285707 A1* | 9/2016 | Pawlowski | H04L 43/045 |
| 2017/0185573 A1* | 6/2017 | Milvaney | G06F 17/2288 |
| 2017/0244784 A1 | 8/2017 | Lam et al. | |
| 2017/0318091 A1* | 11/2017 | Ke | H04L 41/5054 |
| 2017/0344560 A1* | 11/2017 | Talur | G06F 17/30076 |
| 2018/0048712 A1 | 2/2018 | Sarisky et al. | |
| 2018/0191869 A1* | 7/2018 | Mazukabzov | H04L 67/1095 |
| 2018/0196608 A1 | 7/2018 | Ahmed et al. | |
| 2018/0196700 A1 | 7/2018 | Aronovich et al. | |

OTHER PUBLICATIONS

Ahmed et al., U.S. Appl. No. 15/403,069, filed Jan. 10, 2017.
List of IBM Patents or Patent Applications Treated As Related.
Docker, "Volume plugins," Mar. 5, 2016, pp. 1-8, retrieved from https://docs.docker.com/engine/extend/plugins_volume/.
Hu et al., "Avoiding Store Misses to Fully Modified Cache Blocks," Performance, Computing, and Communications onference, 25th IEEE International, Apr. 10-12, 2006, pp. 289-296.
Non-Final Office Action from U.S. Appl. No. 15/400,741, dated Jul. 27, 2018.
U.S. Appl. No. 15/404,096, filed Jan. 11, 2017.
U.S. Appl. No. 15/400,741, filed Jan. 6, 2017.
U.S. Appl. No. 15/403,069, filed Jan. 10, 2017.
Hewlett-Packard Development Company, L. P., "Transform Your Business by Rethinking Your Storage," 2011, pp. 1-12, Retrieved From http://www.hp.com/hpinfo/newsroom/press_kits/2011/optimization2011/HP_Converged_Storage_whitepaper_Nov_2011.PDF.
Information Technology Laboratory, "NIST Cloud Computing Program," Dec. 9, 2013, pp. 1-2, Retrieved From http://www.nist.gov/itl/cloud/.
Mell et al., "The NIST Definition of Cloud Computing," NIST, Information Technology Laboratory, Version 15, Oct. 7, 2009, pp. 1-2.
Mell et al., "The NIST Definition of Cloud Computing," NIST, Special Publication 800-145, 2011, pp. 1-7.
McGinnis, "Cinder," Jun. 2, 2016, pp. 1-6, Retrieved From https://wiki.openstack.org/wiki/Cinder.
OpenStack, "Manila," Jun. 16, 2016, pp. 1-6, Retrieved From https://wiki.openstack.org/wiki/Manila.
ClusterHQ, "What is flocker?" May 6, 2016, pp. 1-9, Retrieved From https://clusterhq.com/flocker/introduction/.
Docker, "Use Docker Engine Plugins," May 6, 2016, pp. 1-11, Retrieved From https://docs.docker.com/engine/extend/legacy_plugins/.
Shanmuganathan et al., "Demand Based Hierarchical QoS Using Storage Resource Pools," Jul. 13, 2012, pp. 1-13, Retrieved From https://www.usenix.org/conference/atc12/technical-sessions/presentation/gulati.
Hitachi Data Systems, "The Value of Converged Infrastructure Solutions for the Business-Defined Economy," White Paper, Aug. 2014, pp. 1-10.
LOGICALIS White Paper, "Storage for Converged Infrastructures," Jul. 2013, pp. 1-8.
Non-Final Office Action from U.S. Appl. No. 15/403,069, dated Aug. 10, 2018.
Oracle, "Advanced Mappings," Oracle Application Server TopLink Application Developer's Guide, Mar. 2016, 7 pages.
Oracle, "Inheritance," Oracle Application Server TopLink Application Developer's Guide, Dec. 2014, 6 pages.
Final Office Action from U.S. Appl. No. 15/400,741, dated Jan. 25, 2019.
Non-Final Office Action from U.S. Appl. No. 15/403,069, dated Aug. 21, 2019.
Final Office Action from U.S. Appl. No. 15/403,069, dated Mar. 11, 2019.
Advisory Action from U.S. Appl. No. 15/400,741, dated Apr. 5, 2019.
Advisory Action from U.S. Appl. No. 15/403,069, dated May 30, 2019.
Non-Final Office Action from U.S. Appl. No. 15/400,741, dated Jun. 25, 2019.
Non-Final Office Action from U.S. Appl. No. 15/400,741, dated Oct. 2, 2019.
Notice of Allowance from U.S. Appl. No. 15/403,069, dated Jun. 26, 2020.
Final Office Action from U.S. Appl. No. 15/403,069, dated Jan. 30, 2020.
Notice of Allowance from U.S. Appl. No. 15/400,741, dated Mar. 3, 2020.
Advisory Action from U.S. Appl. No. 15/403,069, dated Apr. 8, 2020.
Supplemental Notice of Allowance from U.S. Appl. No. 15/403,069, dated Aug. 10, 2020.
Corrected Notice of Allowance from U.S. Appl. No. 15/403,069, dated Sep. 17, 2020.
Notice of Allowance from U.S. Appl. No. 15/400,741, dated May 8, 2020.

\* cited by examiner

MANAGEMENT AND UTILIZATION OF DATA VOLUMES IN A CONVERGED SYSTEM

BACKGROUND

The present invention relates to data management, and more specifically, this invention relates to defining and managing storage resources within a converged system.

Converged systems are a popular way of centralizing management of resources. For example, current converged systems may implement pools of resources that may be shared by multiple applications. Examples of resources within a converged system include software, servers, compute resources, memory resources, data storage devices, networking resources, etc.

For example, current converged systems do not allow for the management of storage resources in addition to computing resources. Additionally, current converged systems fail to enable an effective mapping of both storage resources and computing resources to organizational consumers. Further, current converged systems do not hierarchically allocate and use data storage resources. Further still, current converged systems fail to provide sufficient management functionality for storage capacity and data volumes. Also, current converged systems do not implement the specialization of storage layers.

SUMMARY

A computer-implemented method according to one embodiment includes identifying a request to create a consumer within a converged system, defining the consumer within a hierarchy of consumers, where the consumer represents a function in an organization, setting a storage capacity attribute for the consumer, and conditionally defining a data volume for the consumer, based at least in part on the storage capacity attribute.

According to another embodiment, a computer program product for managing storage attributes in association with a consumer includes a computer readable storage medium having program instructions embodied therewith, wherein the computer readable storage medium is not a transitory signal per se, and where the program instructions are executable by a processor to cause the processor to perform a method comprising identifying, utilizing the processor, a request to create a consumer within a converged system, defining, utilizing the processor, the consumer within a hierarchy of consumers, where the consumer represents a function in an organization, setting, utilizing the processor, a storage capacity attribute for the consumer, and conditionally defining, utilizing the processor, a data volume for the consumer, based at least in part on the storage capacity attribute.

A system according to another embodiment includes a processor, and logic integrated with the processor, executable by the processor, or integrated with and executable by the processor, the logic being configured to identify a request to create a consumer within a converged system, define the consumer within a hierarchy of consumers, where the consumer represents a function in an organization, set a storage capacity attribute for the consumer, and conditionally define a data volume for the consumer, based at least in part on the storage capacity attribute.

Other aspects and embodiments of the present invention will become apparent from the following detailed description, which, when taken in conjunction with the drawings, illustrate by way of example the principles of the invention.

DETAILED DESCRIPTION

Figure 1:
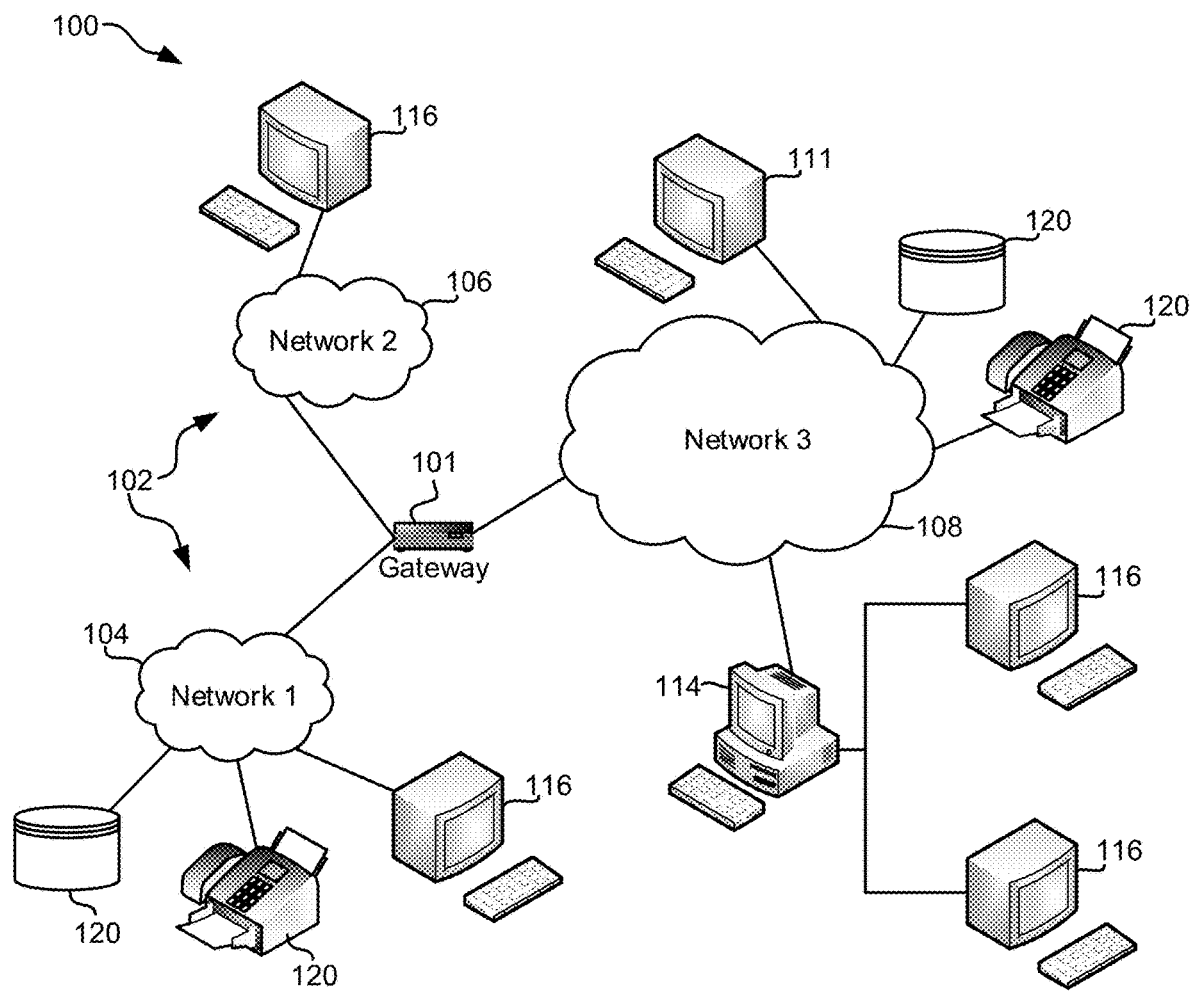
FIG. 1 illustrates a network architecture, in accordance with one embodiment.

The following description discloses several preferred embodiments of systems, methods and computer program products for management and utilization of data volumes in a converged system. Various embodiments provide a method for defining a consumer within an organization of a converged system and setting one or more attributes for the consumer, where such attributes are associated with converged storage resources within the converges system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for management and utilization of data volumes in a converged system.

In one general embodiment, a computer-implemented method includes identifying a request to create a consumer within a converged system, defining the consumer within a hierarchy of consumers, where the consumer represents a function in an organization, setting a storage capacity attribute for the consumer, and conditionally defining a data volume for the consumer, based at least in part on the storage capacity attribute.

In another general embodiment, a computer program product for managing storage attributes in association with a consumer includes a computer readable storage medium having program instructions embodied therewith, wherein the computer readable storage medium is not a transitory signal per se, and where the program instructions are executable by a processor to cause the processor to perform a method comprising identifying, utilizing the processor, a request to create a consumer within a converged system, defining, utilizing the processor, the consumer within a hierarchy of consumers, where the consumer represents a function in an organization, setting, utilizing the processor, a storage capacity attribute for the consumer, and conditionally defining, utilizing the processor, a data volume for the consumer, based at least in part on the storage capacity attribute.

In another general embodiment, a system includes a processor, and logic integrated with the processor, executable by the processor, or integrated with and executable by the processor, the logic being configured to identify a request to create a consumer within a converged system, define the consumer within a hierarchy of consumers, where the consumer represents a function in an organization, set a storage capacity attribute for the consumer, and conditionally define a data volume for the consumer, based at least in part on the storage capacity attribute.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
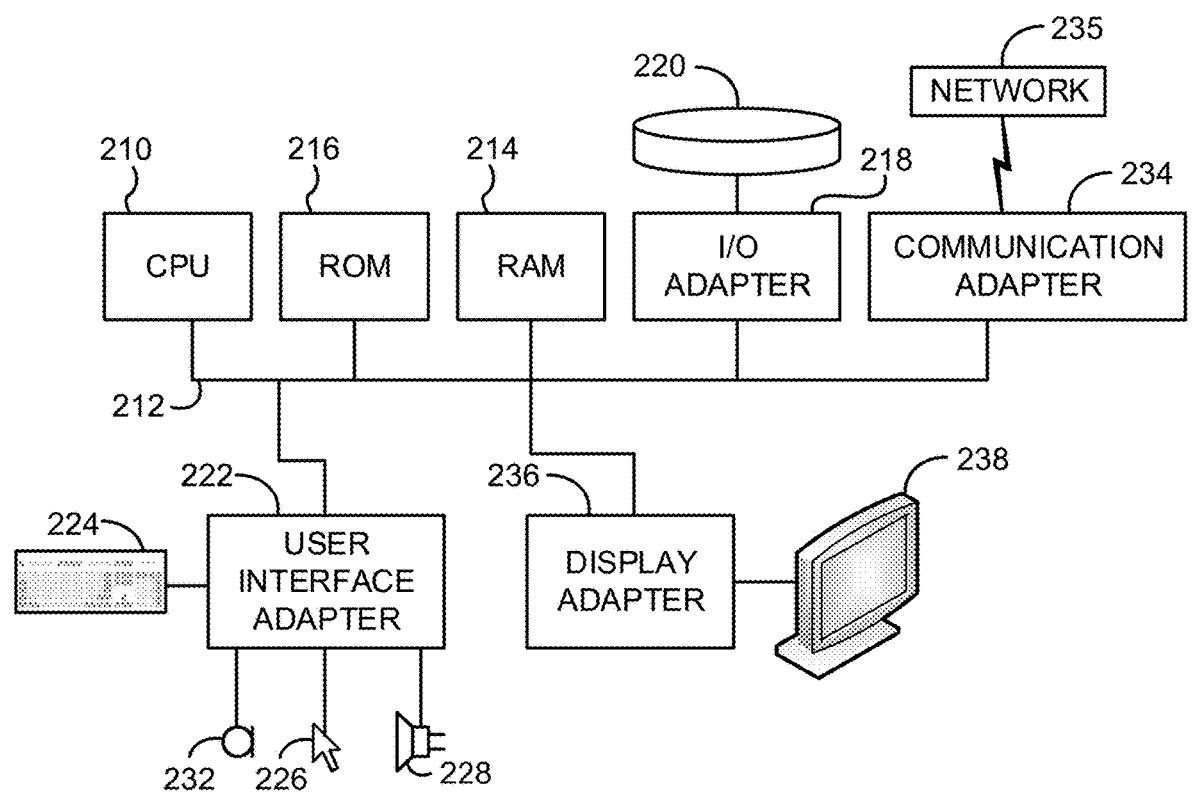
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
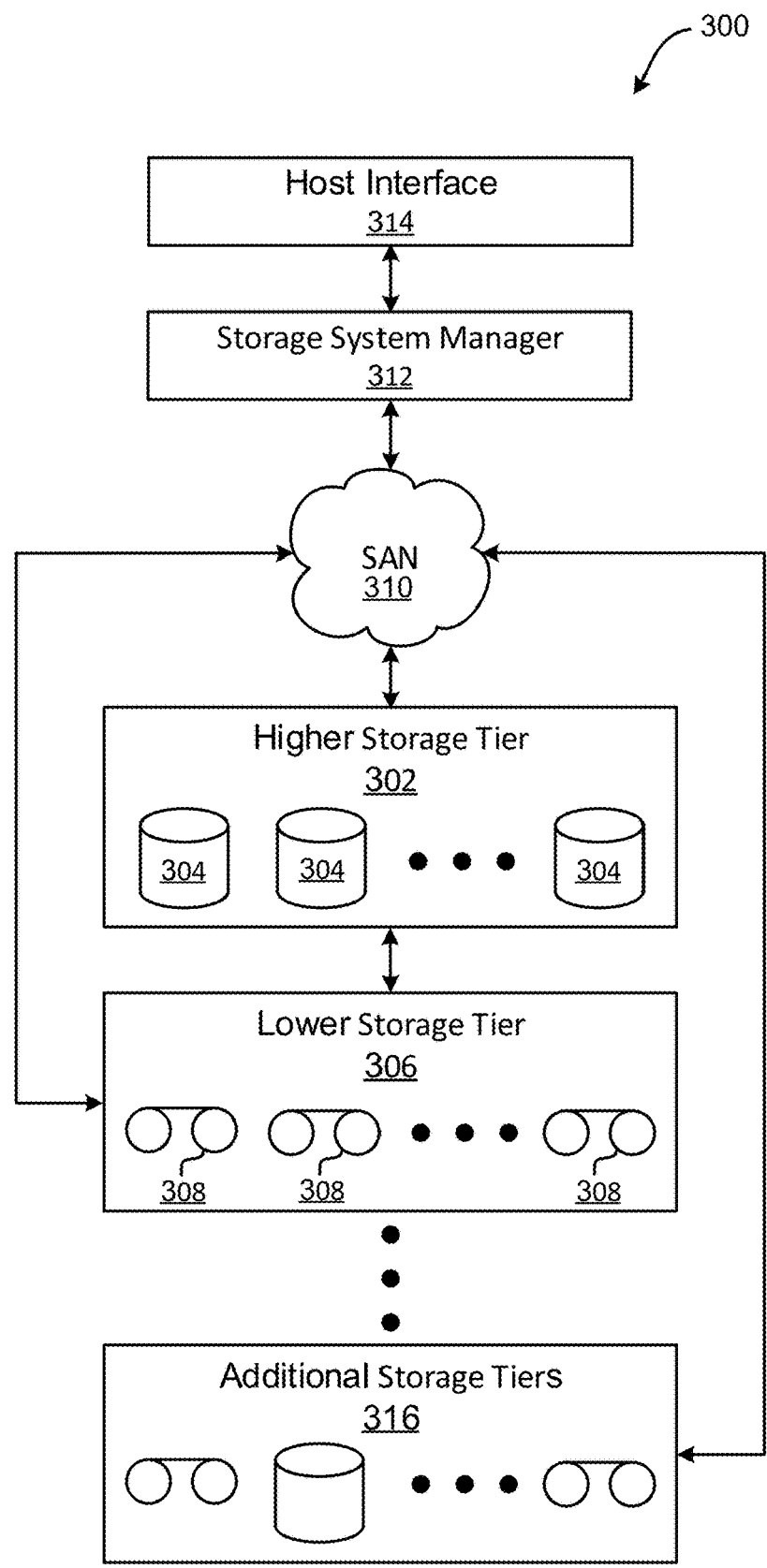
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Hierarchical Storage Resource Attributes

Figure 4:
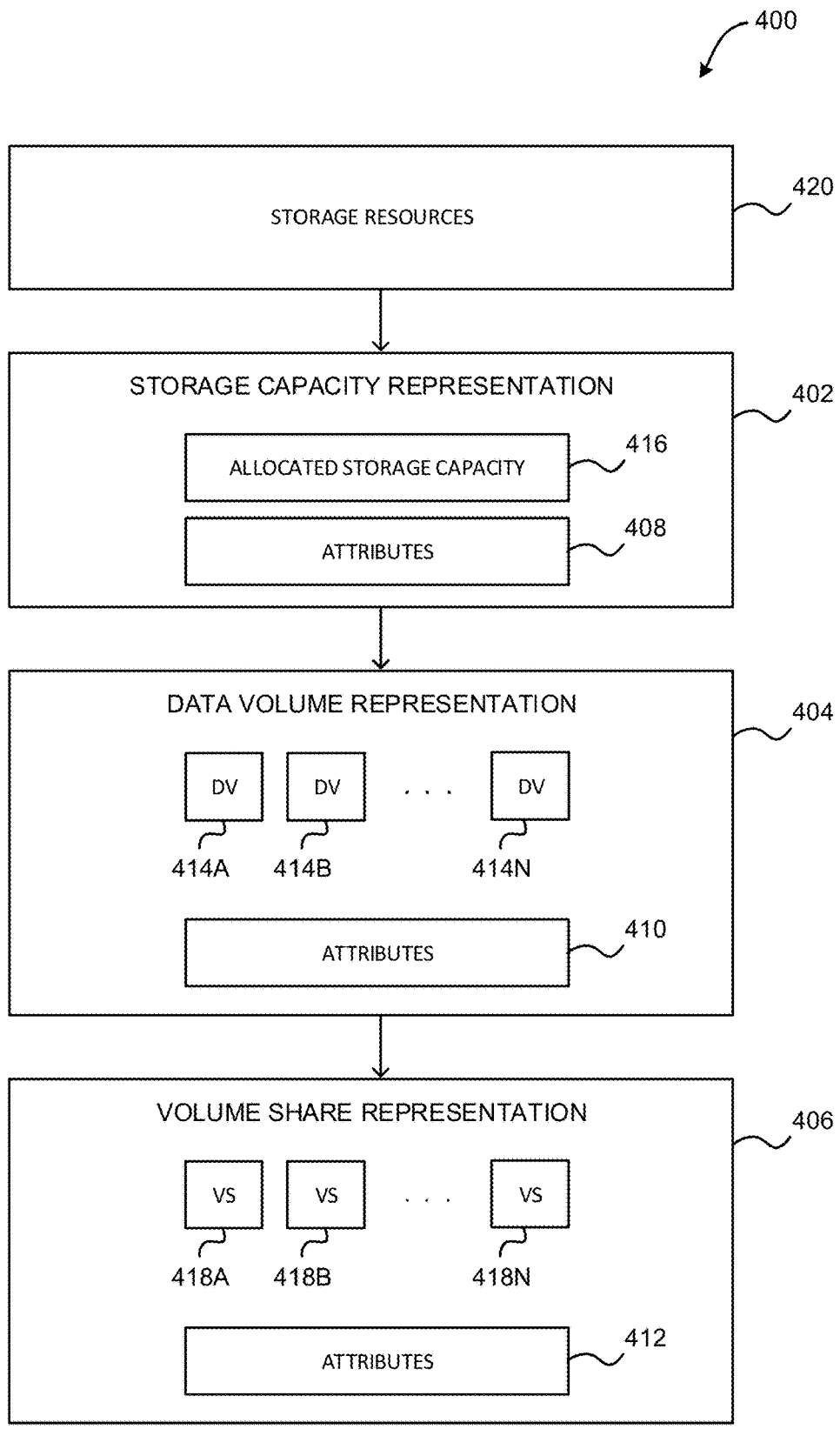
FIG. 4 illustrates an exemplary hierarchical representation of storage resources available to consumers within a converged system, in accordance with one embodiment.

FIG. 4 illustrates an exemplary hierarchical representation 400 of storage resources 420 available to consumers within a converged system, in accordance with one embodiment. In one embodiment, the converged system may group resources such as storage and computing resources into a single package. In another example, the converged system may be included within a cloud computing platform, a multi-tenant environment, etc. For instance, in one embodiment, the storage resources 420 may include any physical storage resource capable of storing data (e.g., one or more hard disks, etc.), cloud-based data storage, etc.

As shown, three hierarchical representations 402-406 of storage resources 420 are provided. In one embodiment, the storage capacity representation 402 may be managed by a storage administrator role. For example, a storage administrator may allocate a storage capacity 416 utilizing the storage capacity representation 402, where the storage capacity 416 may be used as a framework for defining data volumes assigned to a predetermined entity (e.g., a consumer, etc.).

In another embodiment, the storage capacity representation 402 of storage resources 420 has an associated set of attributes 408 that apply to storage capacity 416. For example, the set of attributes 408 may include a size of the storage capacity 416. In another example, the set of attributes 408 may include a total size of the data volumes representation 404 defined within the storage capacity 416.

Also, in one embodiment, the set of attributes 408 may include a quality of service (QoS) for the storage capacity 416. For example, the set of attributes 408 may include one or more input/output (I/O) capacities for the storage capacity 416, data protection provided for the storage capacity 416, a type of a storage device within the storage capacity 416 (e.g., SSD, SATA, SCSI, etc.), a reliability of the storage capacity 416, a responsiveness of the storage capacity 416, etc. In another embodiment, the storage capacity 416 may not enable to be directly consumed by a consumer of the converged system.

Further, in one embodiment, the data volumes representation 404 may also be managed by a storage administrator role. For example, a storage administrator may provision a plurality of data volumes 414A-N within the storage capacity 416, utilizing the data volumes representation 404. In this way, the data volumes representation 404 may add a level of specialization to the storage capacity representation 402 of the storage resources 420.

Further still, in one embodiment, the data volumes representation 404 may inherit the set of attributes 408 of the storage capacity representation 402. The data volumes representation 404 also has an associated set of attributes 410 that apply to each of the data volumes 414A-N defined using the data volumes representation 404. In one embodiment, the set of attributes 410 may include a size limit for each of the data volumes 414A-N. For example, the size limit attribute for each of the data volumes 414A-N may bound a storage consumption of each of the data volumes 414A-N.

Also, in one embodiment, the set of attributes 410 may include an access control for each of the data volumes 414A-N. For example, an access control for each of the data volumes 414A-N may include definitions specifying which users and groups can access each of the data volumes 414A-N, what permissions they are granted with to access data on the data volumes 414A-N, etc.

In addition, in one embodiment, each of the data volumes 414A-N defined using the data volumes representation 404 may be accessed by an application by specifying a name or an identification of the data volume 414A-N. In another embodiment, the data volume 414A-N may then be mounted into an appropriate container and/or process activated by the application. In yet another embodiment, an application may specify one or more references in order to use data volumes 414A-N, e.g., by specifying an identification or name of one or more data volume 414A-N to be used within the application specification, etc.

Furthermore, in one embodiment, when the reference to the one or more data volumes 414A-N is processed, the converged system may verify that the one or more referenced data volumes 414A-N are eligible for use by the referencing application, by checking that the one or more referenced data volumes 414A-N are associated with a consumer with which the application is associated.

Further still, in one embodiment, the volume shares representation 406 may be managed by an application author role. For example, an application author may refine one of the plurality of data volumes 414A-N by defining a plurality of volume shares 418A-N within the data volume 414A-N, utilizing the volume shares representation 406. In this way, the volume shares representation 406 may add a level of specialization to the data volumes representation 404 of the storage resources 420.

Also, in one embodiment, the volume shares representation 406 may inherit the set of attributes 410 of the data volumes representation 404, as well as the set of attributes 408 of the storage capacity representation 402. The volume shares representation 406 also has an associated set of attributes 412 that apply to each of the plurality of volume shares 418A-N defined using the volume shares representation 406.

In one embodiment, the set of attributes 412 may include an access path for each of the plurality of volume shares 418A-N. For example, the access path may identify a file system path for accessing the data volume 514A-N for which the volume share 418A-N is defined. In another example, multiple access paths may be defined for a single data volume 414A-N by defining multiple volume shares 418A-N for the data volume 414A-N.

Additionally, in one embodiment, the set of attributes 412 may include an ownership and sharing model for each of the plurality of volume shares 418A-N. For example, the ownership and sharing model may define which applications and/or containers can access each of the plurality of volume shares 418A-N. In another embodiment, a volume share may be owned and mounted to a single process or a single container. In yet another embodiment, a volume share may be collectively owned and mounted to multiple processes or containers. In still another embodiment, if one or more processes or containers are grouped (e.g., utilizing a hierarchical grouping), then a volume share may be owned by a group of processes or containers and may be mounted by processes or containers in that group. In this way, the ownership and sharing model may define a level of sharing of each of the plurality of volume shares 418A-N by processes and/or containers.

Further, in one embodiment, the set of attributes 412 may include user and group access permissions for each of the plurality of volume shares 418A-N. For example, the user and group access permissions may implement authenticated access to each of the plurality of volume shares 418A-N. In another embodiment, the user and group access permissions may override user and groups access permissions defined for the data volume 414A-N associated with the volume share 418A-N.

Further still, in one embodiment, the plurality of volume shares 418A-N may be defined in order to access and use the storage resources 420. In another embodiment, a dynamic life cycle may also be applied to the plurality of volume shares 418A-N. For example, the plurality of volume shares 418A-N may be dynamically created, mounted, modified, and removed by the converged system, without administrator intervention. For instance, the plurality of volume shares 418A-N may be automatically created if they do not yet exist, and may be mounted into one or more processes or containers as specified within an application specification. In another example, the plurality of volume shares 418A-N may be automatically removed by the converged system as defined within the application specification (e.g., when the last process or container referencing the volume share has been terminated, etc.).

In this way, the three hierarchical representations 402-406 of the storage resources 420 may provide progressively higher levels of specialization of the storage resources 420 for use within a converged system. This implementation of specialized storage layers may enable the effective management of storage resources in addition to computing resources within a converged system.

Hierarchical Consumer Model

Figure 5:
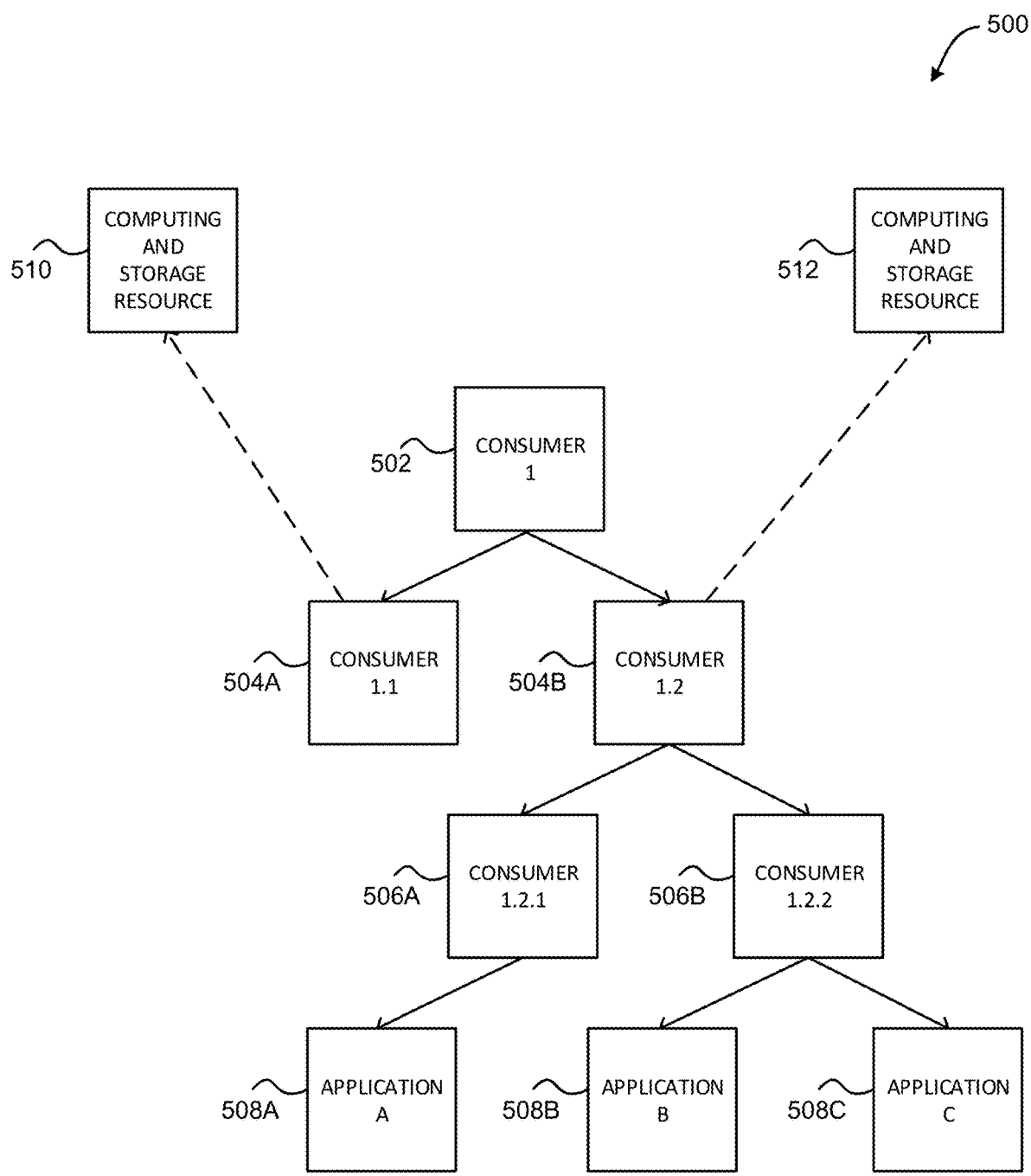
FIG. 5 illustrates an exemplary hierarchical consumer tree, in accordance with one embodiment.

FIG. 5 illustrates an exemplary hierarchical consumer tree 500, in accordance with one embodiment. In one embodiment, the hierarchical consumer tree 500 may be implemented within a converged system. As shown, the hierarchical consumer tree 500 includes a root consumer node 502, child consumer nodes 504A-B and 506A-B, and application nodes 508A-C. Additionally, computing and storage resources 510 is allocated to consumer node 504A, and computing and storage resources 512 is allocated to consumer node 504B.

Further, in one embodiment, the root consumer node 502 includes a root node of the tree 500, and child consumer nodes 504A-B and 506A-B include descendant nodes within the hierarchical consumer tree 500. In another embodiment, child consumer nodes 504A, 506A, and 506B have no descendant consumer nodes and may therefore be leaf consumer nodes within the hierarchical consumer tree 500. In yet another embodiment, the root consumer node 502 and child consumer nodes 504A-B and 506A-B may each represent a function within an organization, such as a division within the organization or a department within the organization.

For example, a consumer created within the converged system may represent a unit within an organization to which computing and storage resources may be assigned through the converged system. In yet another embodiment, application nodes 508A-C each represent applications that may be run within the converged system. In still another embodiment, each of the application nodes 508A-C may be associated with a leaf consumer node of the hierarchical consumer tree 500.

Further still, in one embodiment, each consumer represented by the root consumer node 502 and child consumer nodes 504A-B and 506A-B may have a plurality of associated attributes. For example, each consumer may have an associated identification value and name. In another example, each consumer may have a set of attributes that control a way by which computing and storage resources are made available to the consumer and their associated applications.

Also, in one embodiment, the computing resources may include hardware and software defined resources used for computing purposes (e.g., CPU cores, memory, etc.). In another embodiment, the storage resources may include hardware and software defined resources used for storing data. For example, the hardware and software defined resources may include storage capacity, data volumes, etc. For instance, one or more data volumes may be defined within an assigned storage capacity, and may be used by one or more applications associated with the consumer (e.g., by being mounted into the applications, etc.).

In addition, in one embodiment, the hierarchical consumer tree 500 may allow for resource inheritance. For example, because the application nodes 508A-C are associated with consumer nodes 506A and 506B, and consumer nodes 506A and 506B are children of consumer node 504B, the application nodes 508A-C may inherit access to the computing and storage resources 512 allocated to the consumer node 504B. However, because consumer nodes 506A and 506B are not children of consumer node 504A, the application nodes 508A-C may not access the computing and storage resources 510 allocated to the consumer node 504A.

Furthermore, the storage resources 510 and 512 may each include allocated storage capacity and data volumes. For example, the storage resources 512 may include storage capacity that is assigned to the consumer represented by the child consumer node 504B and a plurality of data volumes that are assigned to the consumer represented by the child consumer node 504B. In another embodiment, an application assigned to a consumer may reference and use data volumes assigned to that consumer, parents of that consumer, and the root consumer. For example, application nodes 508A-C may reference and use the plurality of data volumes that are assigned to the consumer represented by the child consumer node 504B, but may not reference and use any data volumes that are assigned to the consumer represented by the child consumer node 504A.

In this way, storage resources may be allocated to consumers within a converged system, where the allocation includes a hierarchical access mechanism. This may enable an effective mapping of both storage resources and computing resources to consumers of the organization.

Storage Capacity Attribute for a Consumer

Additionally, in one embodiment, each consumer within the converged system may have an associated storage capacity attribute. In another embodiment, the storage capacity attribute may refer to a storage capacity created utilizing the storage capacity representation shown in the hierarchical storage resource attributes in FIG. 4. In yet another embodiment, each storage capacity attribute may have one of a plurality of possible values. For example, the storage capacity attribute may have a disabled value indicating that a storage capacity and volume mechanism is not applied to the associated consumer. This disabled value may be a default value that is assigned during initialization of a consumer within the organization.

Further, in another example, the storage capacity attribute may have an unlimited value indicating that the storage capacity and volume mechanism is applied to this associated consumer and that there is no limit to the storage capacity associated with this associated consumer. In yet another example, the storage capacity attribute may have a limited value that includes a positive value that is a storage capacity limit for the consumer. In one embodiment, the limit may include an upper bound on storage allocated and consumed for the consumer. In another embodiment, the limit may not be larger than actual physical storage capacity that is deployed to the converged system. Further still, in one embodiment, each consumer may have an associated free capacity attribute.

In this way, storage capacity attributes may be assigned to consumers and managed within a converged system.

Updating a Storage Capacity Attribute for a Consumer

Also, in one embodiment, a storage capacity attribute associated with a consumer may be set or updated based on one or more hierarchical rules. For example, the storage capacity attributes of all the consumers may be set to a disabled value during initialization. In another example, the storage capacity attribute of a consumer may be set to a value other than a disabled value (e.g., an unlimited value or a limited value, etc.) when the parent node of the consumer within the hierarchical consumer model has a capacity attribute value that is different than disabled, or if the consumer is a root node (e.g., a node with no parent) within the hierarchical consumer model.

Figure 6:
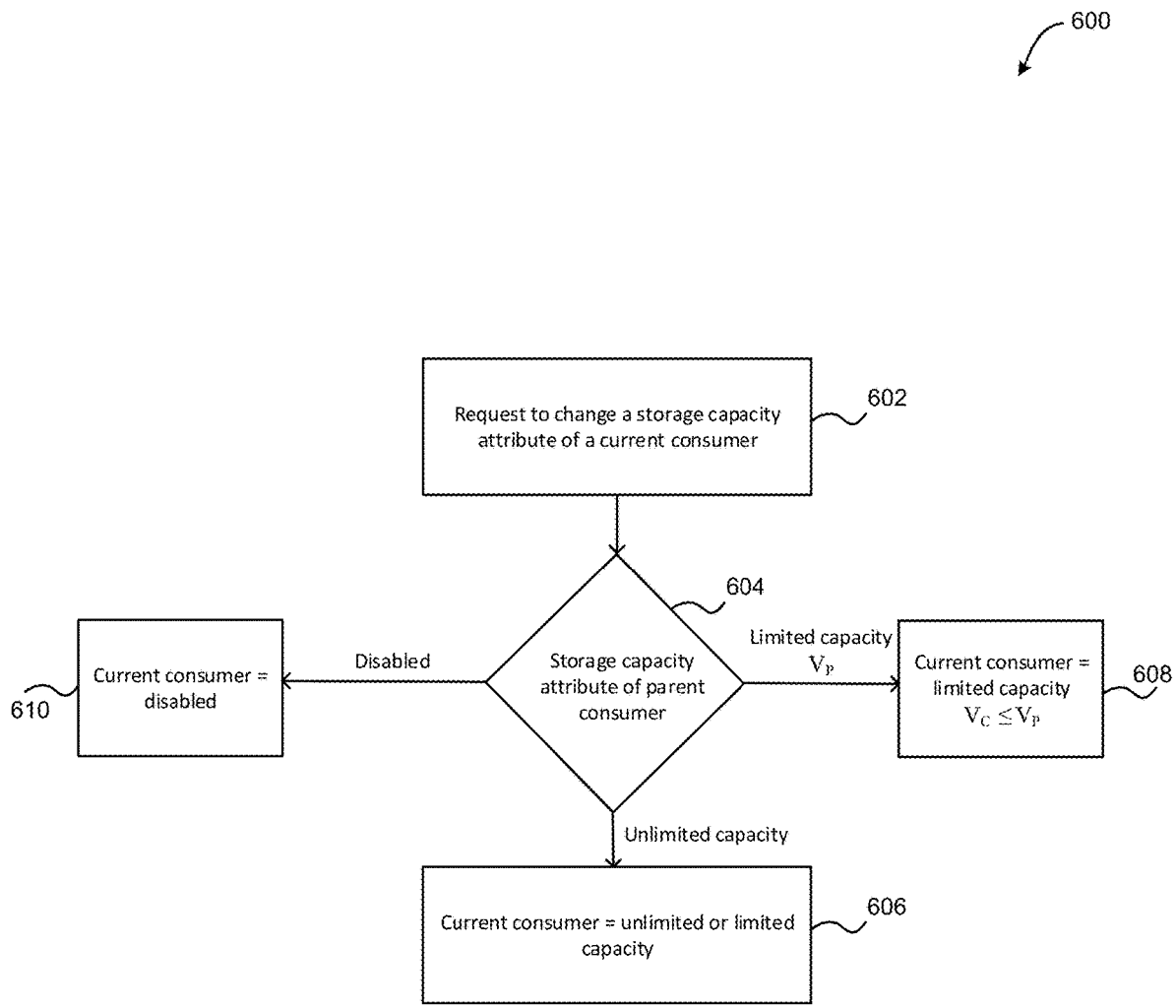
FIG. 6 illustrates a flowchart of a method for determining a storage capacity attribute for a consumer, in accordance with one embodiment.

Now referring to FIG. 6, a flowchart of a method 600 for determining a storage capacity attribute for a consumer is shown according to one embodiment. The method 600 may be performed in accordance with the present invention in any of the environments depicted in FIGS. 1-5, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a request is received to change a storage capacity attribute for a consumer. For example, the request may include a request to change the storage capacity attribute from a default disabled value.

Additionally, method 600 may proceed with decision 604, where a storage capacity attribute of a parent node of the consumer is determined within the hierarchical consumer model. When it is determined in decision 604 that the parent node of the consumer has a storage capacity attribute with an unlimited value, then method 600 may proceed with operation 606, where a storage capacity attribute of the consumer, which is the child of this parent, is allowed to be changed to either an unlimited storage capacity value or a limited storage capacity value.

When it is determined in decision 604 that the parent node of the consumer has a storage capacity attribute with a limited capacity value $V_P$, then method 600 may proceed with operation 608, where a storage capacity attribute of the consumer, which is the child of this parent, is allowed to be changed to a limited capacity value $V_C$, where $V_C$ is less than or equal to $V_P$. When it is determined in decision 604 that the parent node of the consumer has a storage capacity attribute with a disabled value, then method 600 may proceed with operation 610, where the value of the consumer is not changed to a value different than disabled.

In this way, a storage capacity value of a parent consumer node may influence storage capacity values of child consumer nodes of the parent consumer node.

Updating a Data Volume Size Attribute for a Data Volume Assigned to a Consumer

Also, in one embodiment, a data volume size attribute may be defined for a data volume associated with a current consumer within a converged system. A data volume may be defined for a consumer when the consumer has a storage capacity attribute value that is not disabled (e.g., that is either limited or unlimited). In another embodiment, the data volume may refer to a data volume created utilizing the data volume representation shown in the hierarchical storage resource definitions in FIG. 4. In yet another embodiment, the data volume size attribute of a data volume associated with a consumer may be set or updated based on one or more rules.

Figure 7:
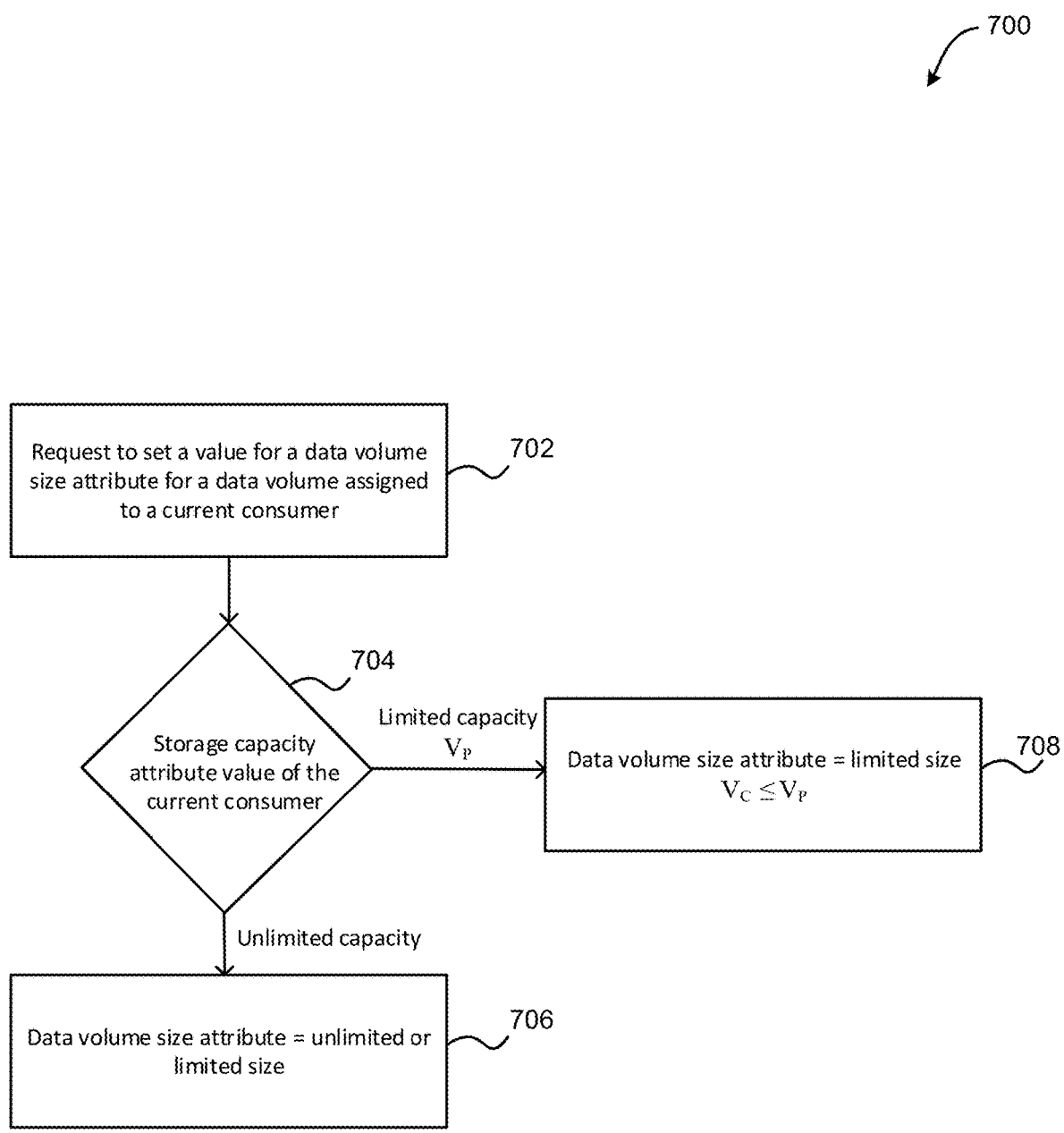
FIG. 7 illustrates a flowchart of a method for defining a data volume size attribute for a consumer, in accordance with one embodiment.

Now referring to FIG. 7, a flowchart of a method 700 for defining a data volume size attribute for a data volume assigned to a current consumer is shown according to one embodiment. The method 700 may be performed in accordance with the present invention in any of the environments depicted in FIGS. 1-5, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where a request is received to set a value for a data volume size attribute for a data volume assigned to a current consumer. For example, the request may include a request to set a value for a data volume size attribute within a given range applied by a storage capacity attribute value.

Additionally, method 700 may proceed with decision 704, where a storage capacity attribute value of the current consumer is determined within the hierarchical consumer model. When it is determined in decision 704 that the current consumer has a storage capacity attribute value with an unlimited value, then method 700 may initiate with operation 706, where a data volume size attribute of the data volume assigned to the current consumer is allowed to be set with either an unlimited size value or a limited size value. When it is determined in decision 704 that the current consumer has a storage capacity attribute value with a limited capacity value $V_P$, then method 700 may initiate with operation 708, where a data volume size attribute of the data volume assigned to the current consumer is allowed to be set with a limited size value $V_C$, where $V_C$ is less than or equal to $V_P$.

In this way, a storage capacity value of a current consumer may influence defined data volume size values of data volumes assigned to the current consumer. Additionally, management functionality may be enabled for data volumes within a converged system.

Calculating Current Free Capacity for a Consumer

In one embodiment, a current free capacity may be calculated for a consumer within a converged system, utilizing one or more storage capacity attributes and data volume size attributes for that consumer. The current free capacity may include an amount of the storage capacity attribute available to the consumer that is currently unused by the consumer. In another embodiment, the current free capacity for a consumer may be stored as an attribute for the consumer. For example, each consumer within a converged system may have both a storage capacity attribute and a free capacity attribute.

Additionally, in one embodiment, the current free capacity for a consumer may have a disabled value if the storage capacity attribute value of the consumer has a disabled value. In another embodiment, the current free capacity attribute value of a consumer may have an unlimited value if the storage capacity attribute value of the consumer has an unlimited value.

Figure 8:
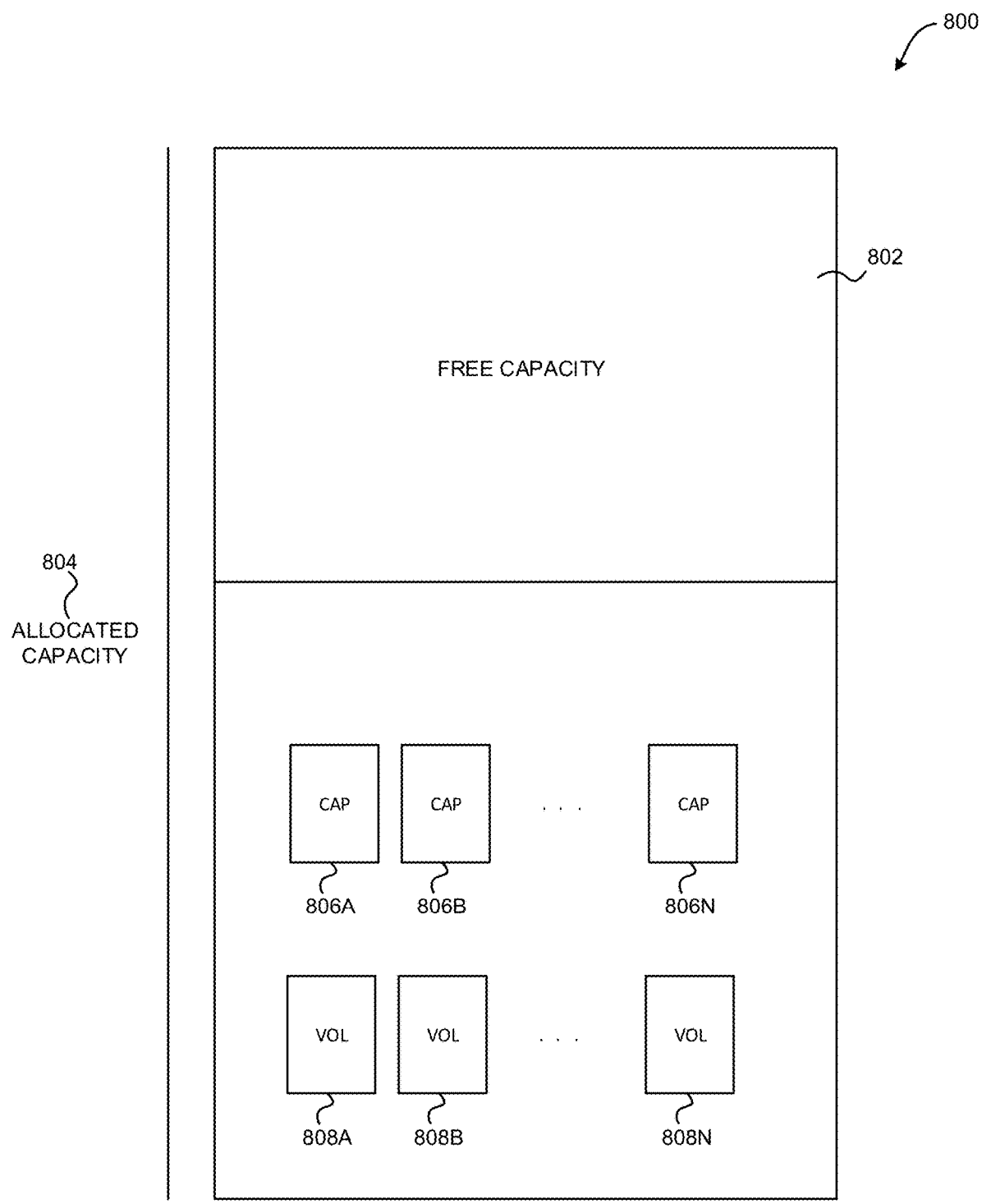
FIG. 8 illustrates an exemplary calculation of a current free capacity for a consumer when the storage capacity attribute for the consumer has a limited value, in accordance with one embodiment.

FIG. 8 illustrates an exemplary calculation 800 of a current free capacity 802 for a consumer within a converged system when the storage capacity attribute value of the consumer is limited, in accordance with one embodiment. As shown, the current free capacity 802 for a consumer is calculated by starting with a total limited capacity 804 allocated to the consumer, subtracting capacity attribute values 806A-N assigned to child consumers of the consumer, and subtracting sizes of all data volumes 808A-N assigned to the consumer.

Further, in one embodiment, the current free capacity for a consumer may not be less than zero. In another embodiment, when setting a new storage capacity limit for a child consumer, the new storage capacity limit for the child consumer cannot be larger than the current free capacity of the parent consumer of the child consumer. In yet another embodiment, when setting a size limit for a data volume assigned to a consumer, the size limit of the data volume cannot be larger than the current free capacity of the consumer.

In this way, storage capacity attributes and data volume size attributes for a consumer may be created and adjusted according to a current free capacity for that consumer.

Handling Addition and Removal of Storage Resources

In one embodiment, storage resources deployed within the converged system may vary over time, and may affect the storage capacity attributes and data volume size attributes of consumers within a converged system. For example, one or more physical storage disks may be added to or removed from the storage resources available to consumers within the converged system.

Additionally, in one embodiment, when storage resources are increased, the added resources may be assigned fully or partially to a root consumer within the hierarchical consumer model. For example, this may be performed by increasing the value of a storage capacity attribute for the root consumer. In another embodiment, this increase may then propagate down to child consumers within the model. For example, the increased storage capacity may be allocated to one or more child consumers, and may be used to define one or more data volumes, etc.

Further, in one embodiment, when storage resources are decreased, one or more adjustments may be made to consumer attributes within the converged system.

Figure 9:
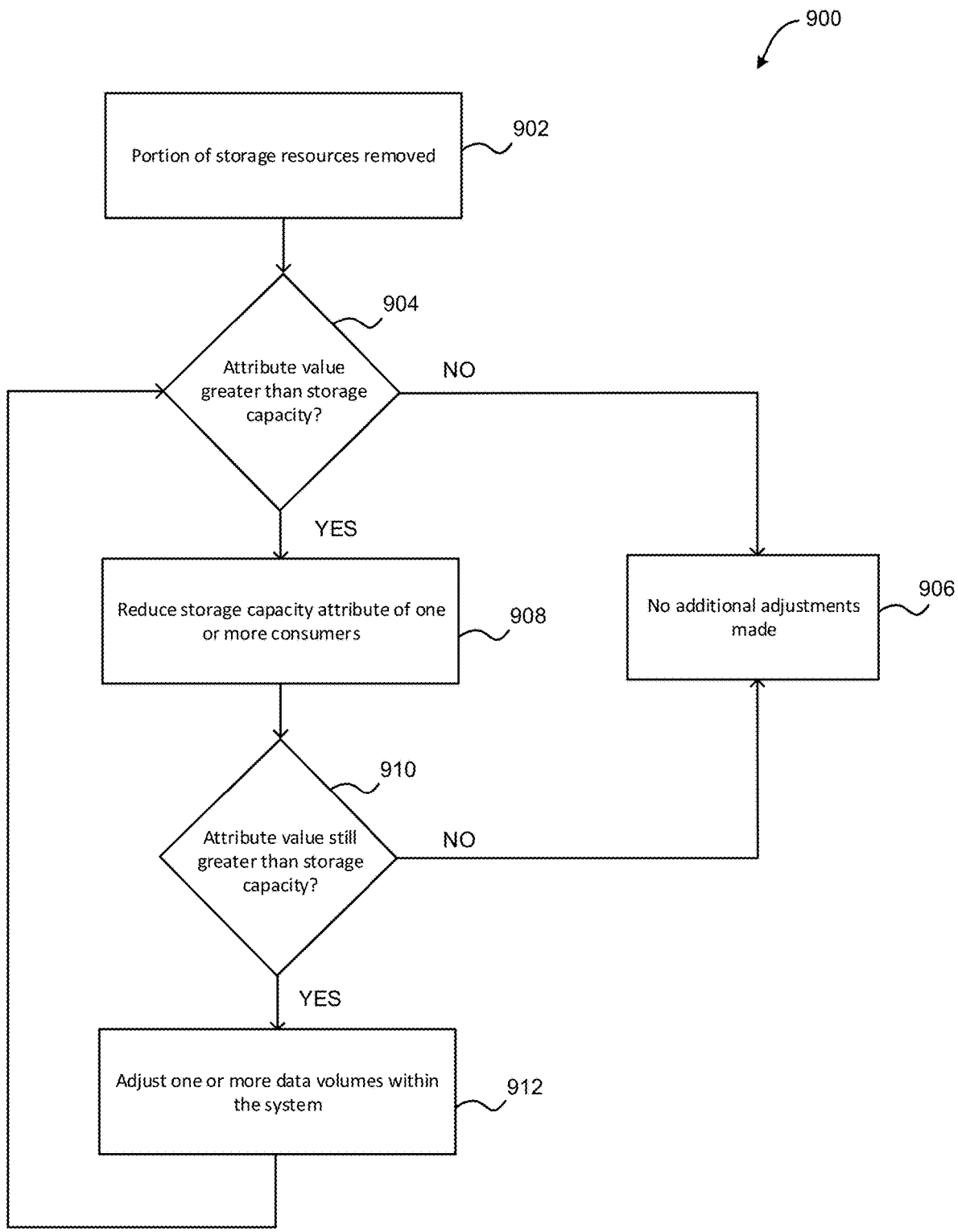
FIG. 9 illustrates a flowchart of a method for responding to removal of storage resources, in accordance with one embodiment.

Now referring to FIG. 9, a flowchart of a method 900 for responding to removal of storage resources is shown according to one embodiment. The method 900 may be performed in accordance with the present invention in any of the environments depicted in FIGS. 1-5, among others, in various embodiments. Of course, more or less operations than those specifically described in FIG. 9 may be included in method 900, as would be understood by one of skill in the art upon reading the present descriptions.

Each of the steps of the method 900 may be performed by any suitable component of the operating environment. For example, in various embodiments, the method 900 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 900. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 9, method 900 may initiate with operation 902, where a portion of storage resources deployed to a converged system is identified as being removed. Additionally, method 900 may proceed with decision 904, where, it is then determined whether a value for the storage capacity attribute assigned to the root consumer is greater than the physical storage capacity of the storage resources deployed to the converged system.

When it is determined in decision 904 that the value for the storage capacity attribute assigned to the root consumer is not greater than the physical storage capacity of the storage resources deployed to the converged system, method 900 may proceed with operation 906, where no additional adjustments are made, as no conflict exists, and the method 900 ends. When it is determined in decision 904 that the value for the storage capacity attribute assigned to the root consumer is greater than the physical storage capacity of the storage resources deployed to the converged system, method 900 may proceed with operation 908, where a value of a storage capacity attribute of one or more consumers is reduced.

In one embodiment, the value of the storage capacity attribute may be reduced for any consumer. For example, storage capacity attribute reduction can be first performed for leaf consumers and implemented upwards through the hierarchical consumer model in a bottom-up method. In another embodiment, when the value of the storage capacity attribute is reduced for a consumer, the value of a storage capacity attribute assigned to the consumer may be reduced by a value that is not larger than the current free capacity value of that consumer. In yet another embodiment, the value of a storage capacity attribute value assigned to the consumer may be reduced to zero. When the storage capacity attribute value of the consumer reaches zero, the storage capacity attribute value for the consumer may then be given a disabled value.

Additionally, method 900 may proceed with decision 910, where it is determined whether an updated value for the storage capacity attribute assigned to the root consumer is greater than the physical storage capacity of the storage resources deployed to the converged system. When it is determined in decision 910 that the updated value for the storage capacity attribute assigned to the root consumer is not greater than the physical storage capacity of the storage resources deployed to the converged system, method 900 may proceed with operation 906, where no additional adjustments are made, as no conflict now exists, and the method 900 ends.

Further, when it is determined in decision 910 that the updated value for the storage capacity attribute assigned to the root consumer is still greater than the physical storage capacity of the storage resources deployed to the converged system, method 900 may proceed with operation 912, where one or more data volumes are adjusted within the converged system. In one embodiment, adjusting one or more data volumes within the converged system may include reducing a size of a data volume. For example, the data volume may be reduced to a size not less than an actual size used by data written in the data volume. In another example, the data volume may be reduced to a size less than an actual size used by data written in the data volume. In another embodiment, further data may not be written to the data volume until previous data is removed from the data volume to bring the actual size used by the data lower than the reduced size of the data volume.

Further still, in one embodiment, adjusting one or more data volumes within the converged system may include removing a data volume. In another embodiment, the data contained within the data volume may also be removed. The operations of adjusting one or more data volumes may increase current free capacity values of consumers to which the data volumes are associated, and may allow for further reduction of values of a storage capacity attribute of the consumers. After one or more data volumes are adjusted in operation 912, the method may then proceed by returning to decision 904.

In this way, reductions and adjustments may be iteratively performed until the value for the storage capacity attribute assigned to the root consumer is equal to or less than the physical storage capacity of the storage resources deployed to the converged system. In one embodiment, while the value for the storage capacity attribute assigned to the root consumer is greater than the physical storage capacity of the storage resources deployed to the converged system, no additional data volumes may be defined for one or more consumers, and the storage capacity attribute for the one or more consumers may not be increased.

Data Volumes Access Control

In one embodiment, access control definitions for accessing data stored in a data volume may include one or more user accounts and user groups with associated data permissions, where the data permissions specify one or more actions that may be performed on the data stored in the data volume. For example, the one or more actions may include performing one or more reads on the data stored in the data volume, performing one or more writes on the data stored in the data volume, running one or more specific programs stored in the data volume, etc.

Additionally, in one embodiment, lists of user accounts and user groups with associated data permissions (e.g. read, write, execute) may be defined for data volumes and for consumers. These lists may be used to define and implement authenticated access for data volumes. In another embodiment, the lists that are defined for a specific consumer may be used to define and implement authenticated access for data volumes defined for that specific consumer and for the consumers included in the sub-tree rooted by the specific consumer.

Further, in one embodiment, the lists that are defined for a specific data volume may be used to define and implement authenticated access for that specific data volume, in conjunction with the lists inherited from the consumer with which the data volume is associated, from the consumers on the path from that consumer to a root consumer, and from the root consumer. In another embodiment, the information in the lists defined for a data volume may override conflicting information defined in any of the inherited lists.

For example, for any user account or user group that is included in the lists for a specific data volume as well as in any of the lists inherited from consumers, the information for that user account or user group included in the lists defined for the data volume may override the information for that user account or user group included in any of the lists inherited from consumers.

In this way, access to data volumes may be effectively managed within a converged system.

Calculating Storage Statistics

In one embodiment, storage statistics may be calculated and reported for data volumes and consumers within a converged systems environment. For example, storage statistics may be presented for consumers, and then a user may drill down to storage statistics for the data volumes associated with the consumers. In another embodiment, storage statistics for consumers may be presented in conjunction with statistics of compute and other resources, also aggregated to the consumer's level.

Additionally, in one embodiment, in cases for example where consumers represent specific applications, such statistics may show the storage and compute resource consumption of these applications. In another embodiment, storage statistics may include storage size consumption, IO capacity consumption, etc. The calculated statistics of different types may be translated into a uniform scale, (e.g., 0-100, etc.), to facilitate additional clarify in considering various statistics elements of different types of resources. In another embodiment, the statistics may be calculated and presented using sliding time windows of various resolutions (e.g. an hour, a day, etc.).

Further, in one embodiment, for aggregating storage statistics for data volumes and for consumers, one of a plurality of methods may be used corresponding to a level for which the storage system being used is maintaining storage statistics.

For example, in one method, the storage system being used may be aware of the data volume construct and of association of files to data volumes. In this method the storage system may calculate and aggregate storage statistics for each of the data volumes. This may be done by maintaining and updating storage statistics variables for each data volume. Such storage statistics may be updated when I/O operations are applied to files or objects within a data volume. Storage statistics of the data volumes granularity may then be aggregated to consumers, using the association of data volumes to consumers.

In another example, the storage system being used may be unaware of the data volume construct, and may maintain storage statistics on the file or object granularity. In this method storage statistics of the file or object granularity may be aggregated to the data volume granularity using the association of files or objects to data volumes, and then storage statistics of the data volume granularity may be aggregated to the consumer granularity using the association of data volumes to consumers.

In yet another example, the storage system being used may be unaware of the data volume construct, and may maintain storage statistics on the storage device granularity. In this method a storage device may be defined to be dedicated to a single data volume by defining an association of a storage device to a data volume. In this method storage statistics of the storage device granularity may be aggregated to the data volume granularity using the association of storage devices to data volumes, and then storage statistics of the data volume granularity may be aggregated to the consumer granularity using the association of data volumes to consumers.

Consumer Storage Capacity Management Example

Figure 10:
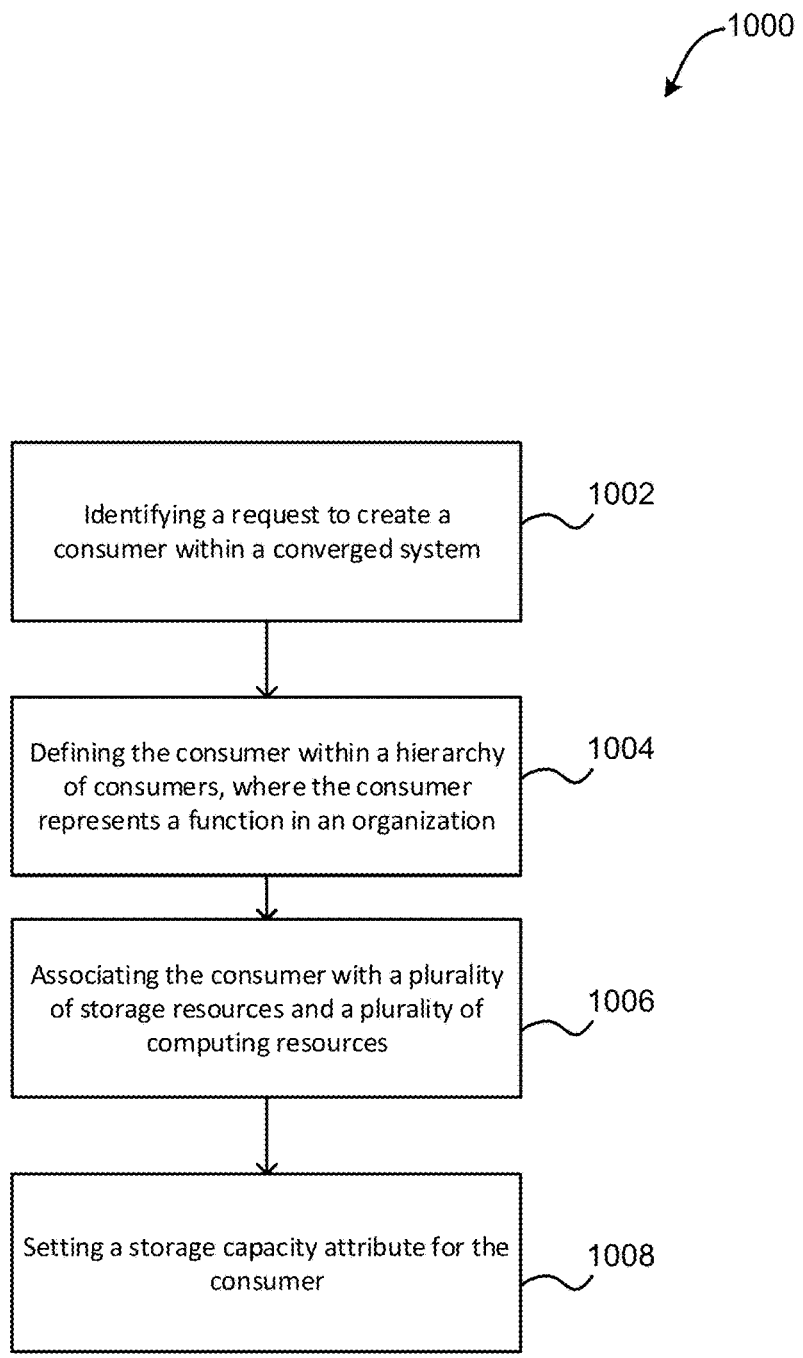
FIG. 10 illustrates a flowchart of a method for managing storage capacity in association with a consumer, in accordance with one embodiment.

Now referring to FIG. 10, a flowchart of a method 1000 for managing storage resources in a converged system is shown according to one embodiment. The method 1000 may be performed in accordance with the present invention in any of the environments depicted in FIGS. 1-5, among others, in various embodiments. Of course, more or less operations than those specifically described in FIG. 10 may be included in method 1000, as would be understood by one of skill in the art upon reading the present descriptions.

Each of the steps of the method 1000 may be performed by any suitable component of the operating environment. For example, in various embodiments, the method 1000 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 10, method 1000 may initiate with operation 1002, where a request to create a consumer within a converged system is identified. Additionally, method 1000 may proceed with operation 1004, where the consumer is defined within a hierarchy of consumers, where the consumer represents a function in an organization. For example, the function may include a unit within the organization to which one or more resources are allocated. In one embodiment, the hierarchy may include a hierarchical representation of a plurality of different consumers within the organization. In another embodiment, the hierarchy of consumers may include a tree organizational structure. For example, the tree may include a root node representative of a root consumer, descendant nodes (e.g., child nodes, etc.) representative of sub consumers, and leaf nodes representative of leaf consumers with no descendants. In another example, applications that may be run within the converged system are associated with leaf consumers.

Further, method 1000 may proceed with operation 1006, where the consumer is associated with a plurality of storage resources and a plurality of computing resources. For example, the storage resources may include resources used for storing data (e.g., physical storage capacity such as hard drives, cloud-based data storage, etc.). In another example, the computing resources may include resources for performing processing (e.g., CPU cores, memory, etc.).

In another embodiment, access to the storage resources and computing resources may be managed based at least in part on the hierarchy of consumers. For example, allocation of resources may be inherited within the hierarchy. In another example, access to data volumes may be inherited within the hierarchy.

Further still, method 1000 may proceed with operation 1008, where a storage capacity attribute is set for the consumer. In one embodiment, the storage capacity attribute may indicate an amount of data storage that is allocated to the consumer. In another embodiment, the storage capacity attribute may have one of a plurality of values. For example, the storage capacity attribute may have a disabled value that indicates that no storage resources are allocated to the consumer. In another example, the storage capacity attribute may have an unlimited value that indicates that an unlimited amount of storage resources are allocated to the consumer. In yet another example, the storage capacity attribute may have a limited value (e.g., a positive numerical value, etc.) that indicates a limited amount of storage resources that are allocated to the consumer.

In this way, the management of storage resources in addition to computing resources may be provided for consumers of a converged system. Additionally, both storage resources and computing resources may be effectively mapped to consumers within the converged system.

Also, in one embodiment, the storage capacity may be pre-set with the disabled value for the consumer when the consumer is created/initialized. In another embodiment, the storage capacity attribute may be set to the unlimited value when the consumer has no parent, or a parent with a storage capacity attribute set to an unlimited value, within the hierarchy of consumers. In yet another embodiment, the storage capacity attribute may be set to a first limited value when the consumer has no parent, or has a parent with a storage capacity attribute set to an unlimited value, or has a parent with a storage capacity attribute set to a second limited value higher than the first limited value, within the hierarchy of consumers.

In addition, in one embodiment, a current free capacity may be determined for the consumer when the storage capacity for the consumer is set to a limited capacity value, wherein the current free capacity is determined by subtracting from the limited capacity value a storage capacity of all child consumers of the consumer within the hierarchy of consumers. In another embodiment, the current free capacity for the consumer may be maintained as a non-negative number. In yet another embodiment, a request to change the storage capacity attribute for the consumer to a new value may be identified, and the change of the storage capacity attribute may be allowed when it is determined that the new value or a difference between the new value and the existing value is not larger than the current free capacity for a parent consumer of the consumer.

Furthermore, in one embodiment, a root consumer may be identified within the hierarchy of consumers, and the storage capacity attribute may be set for the root consumer to be less than or equal to a total amount of the plurality of storage resources provided by a plurality of storage systems. In another embodiment, an increase or decrease in a physical storage capacity provided by the plurality of storage systems (e.g., an addition or removal of one or more physical storage drives, etc.) may be identified. In yet another embodiment, in response to identifying an increase in a physical storage capacity provided by the plurality of storage systems, at least a portion of the increased storage capacity may be assigned to a root consumer by increasing a value of a storage capacity attribute of a root consumer.

Further still, in one embodiment, in response to identifying a removal of a portion of the physical storage capacity provided by the plurality of storage systems, one or more reductions may be performed to a storage capacity attribute of one or more consumers within the converged system, and one or more data volumes may be adjusted within the converged system. In another embodiment, reductions may be iteratively performed until the value for the storage capacity attribute assigned to the root consumer is equal to or less than the physical storage capacity provided by the plurality of storage systems.

Also, in one embodiment, adjusting the one or more data volumes within the converged system may include one or more of reducing a size of a data volume and removing a data volume. In another embodiment, the value of the storage capacity of one or more consumers may be decreased so that, for each of the one or more consumers, the value of the decrease in the storage capacity for the consumer is not greater than a current free capacity for the consumer. In yet another embodiment, the value of the storage capacity of one or more consumers within the organization may be decreased utilizing a bottom-up method.

Additionally, in one embodiment, when a storage capacity value for a consumer is determined to be zero, then the storage capacity value for the consumer may be assigned a disabled value. In another embodiment, reducing the storage consumption of one or more consumers within the organization may include reducing a size of a data volume to a size not less than an actual size used by data written in the data volume, or reducing a size of a data volume to a size less than an actual size used by data written in the data volume, where further data may not be written to the data volume until previous data is removed from the data volume to bring the actual size used by the data lower than the reduced size of the data volume.

Further, in one embodiment, while the value for the storage capacity attribute assigned to the root consumer is greater than the physical storage capacity, no additional data volumes may be defined for consumers within the converged system, and the storage capacity attribute for consumers within the organization may not be increased.

Storage Attribute Management Example

Figure 11:
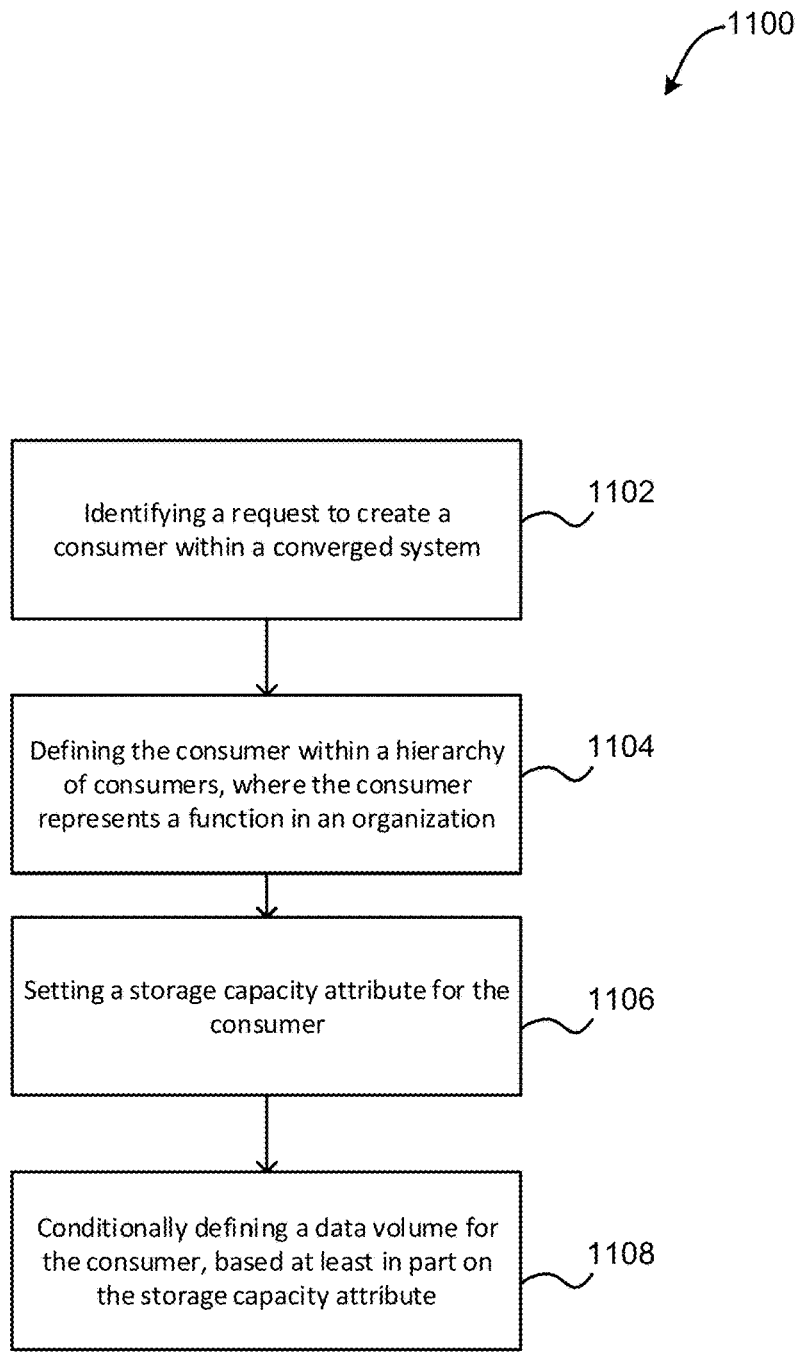
FIG. 11 illustrates a flowchart of a method for managing storage capacity and data volumes in association with a consumer, in accordance with one embodiment.

Now referring to FIG. 11, a flowchart of a method 1100 for managing storage attributes in association with a consumer is shown according to one embodiment. The method 1100 may be performed in accordance with the present invention in any of the environments depicted in FIGS. 1-5, among others, in various embodiments. Of course, more or less operations than those specifically described in FIG. 11 may be included in method 1100, as would be understood by one of skill in the art upon reading the present descriptions.

Each of the steps of the method 1100 may be performed by any suitable component of the operating environment. For example, in various embodiments, the method 1100 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 1100. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 11, method 1100 may initiate with operation 1102, where a request to create a consumer within a converged system is identified. Additionally, method 1100 may proceed with operation 1104, where the consumer is defined within a hierarchy of consumers, where a consumer represents a function in an organization. Further, method 1100 may proceed with operation 1106, where a storage capacity attribute is set for the consumer. Further still, method 1100 may proceed with operation 1108, where a data volume is conditionally defined for the consumer, based at least in part on the storage capacity attribute.

In this way, management functionality may be provided for storage capacity and data volumes within a converged system.

Also, in one embodiment, the data volume may be defined for the consumer when it is determined that the storage capacity attribute for the consumer does not have a disabled value. In another embodiment, a size of the data volume may be set. In yet another embodiment, a current free capacity may be determined for the consumer when the storage capacity for the consumer is set to a limited value. For example, the current free capacity may be determined by subtracting from the limited value of the storage capacity of the consumer a storage capacity of a plurality of child consumers of the consumer within the hierarchy of consumers as well as sizes of a plurality of data volumes defined for the consumer.

In addition, in one embodiment, the current free capacity for the consumer may be maintained as a non-negative number. In another embodiment, the size of the data volume may have an unlimited value or a limited value when the storage capacity attribute for the consumer has an unlimited value. In yet another embodiment, the size of the data volume may have a limited value when the storage capacity attribute for the consumer has a limited value, where the data volume size is at most the value of the storage capacity attribute of the consumer.

Furthermore, in one embodiment, the data volume may be referenced by an application assigned to the consumer. In another embodiment, another data volume that is assigned to an ancestor consumer of the consumer within the hierarchy of consumers may be referenced by an application assigned to the consumer. In yet another embodiment, a list of user accounts and user groups with associated access permissions for data volumes may be associated with the consumer, where the access permissions may allow authenticated access to the data volumes.

Further still, in one embodiment, descendant consumers of a consumer within the hierarchy of consumers may inherit the list of user accounts and user groups with associated access permissions associated with the consumer. In another embodiment, a list of user accounts and user groups with associated access permissions for the data volume may be associated with the data volume. In yet another embodiment, the list of user accounts and user groups with associated access permissions associated with the data volume may override a plurality of lists of user accounts and user groups with associated access permissions associated with the consumer or inherited from ancestor consumers of the consumer.

Also, in one embodiment, the hierarchy of consumers may be formed as a tree structure. In another embodiment, storage statistics for the data volume may be calculated and reported. In yet another embodiment, storage statistics may be aggregated for a plurality of data volumes and consumers by performing one or more of: configuring a storage system to maintain storage statistics on file or object granularity, aggregating storage statistics on the file or object granularity to a data volume granularity using an association of files or objects to data volumes, and aggregating storage statistics of the data volume granularity to a consumer granularity using the association of data volumes to the consumers.

Additionally, in one embodiment, storage statistics may be aggregated for a plurality of data volumes and consumers by performing one or more of: configuring a storage system to maintain storage statistics on a storage device granularity, defining a storage device to be dedicated to a single data volume, aggregating storage statistics of the storage device granularity to a data volume granularity using an association of storage devices to data volumes, and aggregating storage statistics of the data volume granularity to a consumer granularity using the association of data volumes to consumers. In another embodiment, the storage statistics may be translated from different types into a uniform scale, and may be presented using one or more sliding time windows of various resolutions.

Managing Converged Storage Resources Example

Figure 12:
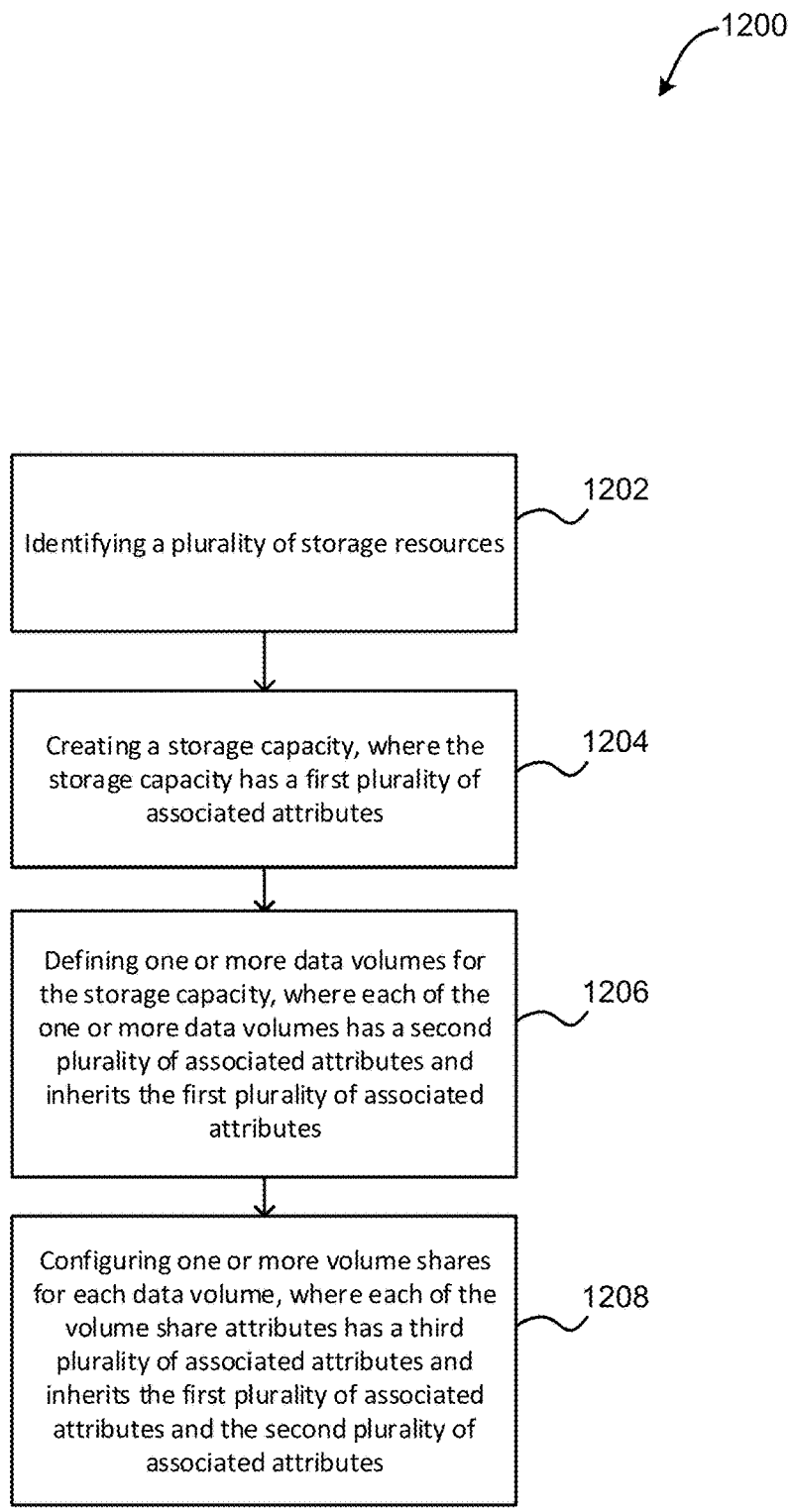
FIG. 12 illustrates a flowchart of a method for managing a hierarchy of converged storage resources, in accordance with one embodiment.

Now referring to FIG. 12, a flowchart of a method 1200 for managing converged storage resources is shown according to one embodiment. The method 1200 may be performed in accordance with the present invention in any of the environments depicted in FIGS. 1-6, among others, in various embodiments. Of course, more or less operations than those specifically described in FIG. 12 may be included in method 1200, as would be understood by one of skill in the art upon reading the present descriptions.

Each of the steps of the method 1200 may be performed by any suitable component of the operating environment. For example, in various embodiments, the method 1200 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 1200. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 12, method 1200 may initiate with operation 1202, where a plurality of storage resources are identified. In one embodiment, the storage resources may include storage resources that are grouped into a single logical entity. Additionally, method 1200 may proceed with operation 1204, where a storage capacity is created, where the storage capacity has a first plurality of associated attributes. In one embodiment, the first plurality of associated attributes may include one or more of a size of the storage capacity and a quality of service (QoS) for the storage capacity.

Further, method 1200 may proceed with operation 1206, where one or more data volumes are defined for the storage capacity, where each of the one or more data volumes has a second plurality of associated attributes and inherits the first plurality of associated attributes. In one embodiment, the one or more data volumes may form a specialized representation of the converged storage resources, and can be referenced and utilized by one or more applications within a converged system.

For example, a data volume may be accessed by an application by specifying the name of the data volume. In another example, the data volume may then be mounted into an appropriate container or process activated by the application. In another embodiment, the second plurality of associated attributes may include one or more of a size limit that bounds a storage consumption of the data volume, and access control defining user and group access permissions for accessing the data volume.

Further still, method 1200 may proceed with operation 1208, where one or more volume shares are configured for each data volume, where each of the volume shares has a third plurality of associated attributes and inherits the first plurality of associated attributes and the second plurality of associated attributes. In one embodiment, the volume shares may form a specialized representation of the converged storage resources, and can be used to access and use the converged storage resources.

For example, the volume shares may be managed with a dynamic life cycle, and may be automatically created, mounted, modified, and removed by one or more applications within the converged system. In another embodiment, the third plurality of associated attributes may include one or more of an access path to the data volume for which the volume share is associated, an ownership and sharing model that defines which applications and containers can access the volume share, and user and group access permissions that implement authenticated access to the volume share.

In this way, data storage resources may be hierarchically managed, allocated and used. Additionally, data storage layers may be specialized.

Also, in one embodiment, the third plurality of associated attributes for a volume share may override any conflicting attributes within the second plurality of associated attributes for an associated data volume. In another embodiment, the second plurality of associated attributes for an associated data volume may override any conflicting attributes within the first plurality of associated attributes for an associated storage capacity. In yet another embodiment, a total size of the one or more data volumes may be limited to a size of the storage capacity.

In addition, in one embodiment, one or more of the volume shares may be configured to be mounted to one or more processes or containers. In another embodiment, each of the one or more volume shares may be automatically created, mounted, and shared by the converged system. In yet another embodiment, one of the one or more volume shares may be automatically removed by the converged system when a process or container referencing the one volume share is terminated.

Furthermore, in one embodiment, the plurality of storage capacities and the plurality of data volumes may be defined and managed by an administrator role within the converged system. In another embodiment, the plurality of volume shares may be defined and managed by an application author role within the converged system. In yet another embodiment, storage statistics for one or more consumers within the converged system may be gathered and reported.

Further still, in one embodiment, storage statistics for one or more consumers may be presented within the converged system, where storage statistics for the one or more data volumes for one or more consumers within the converged system may be presented in response to drilling down. For example, drilling down may include requesting a higher level of detail for a storage capacity (e.g., by clicking on a representation of the storage capacity within a GUI to reveal more detail, etc.).

Also, in one embodiment, storage statistics for one or more consumers within the converged system may be presented in addition to compute statistics for the one or more consumers. In another embodiment, storage statistics may be calculated and aggregated for each of the one or more data volumes, in association with one or more consumers. In yet another embodiment, storage statistics for each of the one or more data volumes may be updated when I/O operations are applied to files or objects within one or more of the data volumes.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
identifying a request to create a consumer within a converged system;
defining the consumer within a hierarchy of consumers, where:
the consumer represents a unit within an organization that receives computing and storage resources assigned to the consumer through the converged system,
the consumer has one or more associated applications that are run within the converged system,
the consumer has a set of attributes that control a way by which the computing and storage resources are made available to the consumer and its associated applications, and
the hierarchy of consumers includes a hierarchical consumer tree that allows for resource inheritance;
setting the set of attributes, including a storage capacity attribute, for the consumer, including:
assigning the storage capacity attribute a disabled value in response to determining that a storage capacity mechanism is not applied to the consumer,
assigning the storage capacity attribute an unlimited value in response to determining that there is no limit to a storage capacity associated with the associated consumer, and
assigning the storage capacity attribute a limited value in response to determining that a positive value storage capacity limit is assigned to the consumer, the limited value indicating an upper bound on storage allocated to the consumer,
assigning the storage capacity attribute the disabled value during an initialization of the consumer,
assigning the storage capacity attribute the unlimited value or the limited value in response to determining that a parent node of the consumer within the hierarchical consumer tree has a capacity attribute that is different than disabled, and assigning the storage capacity attribute the unlimited value or the limited value in response to determining that the consumer is a root node within the hierarchical consumer tree; and conditionally providing access to a data volume to the one or more associated applications, based at least in part on the storage capacity attribute.

2. The computer-implemented method of claim 1, wherein the consumer has an associated identification value and name.

3. The computer-implemented method of claim 1, wherein access to data volumes assigned to the consumer, parents of the consumer within the hierarchical consumer tree, and a root consumer within the hierarchical consumer tree is provided to the one or more associated applications.

4. The computer-implemented method of claim 1, wherein the hierarchy of consumers includes:
- the root node representing another unit within the organization to which computing and storage resources are allocated,
- a plurality of child nodes of the root node representing sub-consumers, and
- a plurality of leaf nodes representing applications run within the converged system;
- wherein the root node and the plurality of child nodes each have the set of attributes, where the set of attributes further includes:
- a name, and
- an identification value;
- wherein each of the plurality of child nodes inherits access to the computing and storage resources allocated to a parent of the child node.

5. The computer-implemented method of claim 1, further comprising aggregating storage statistics for a plurality of data volumes and consumers by:
- configuring a storage system to maintain storage statistics on file or object granularity,
- aggregating storage statistics on the file or object granularity to a data volume granularity using an association of files or objects to data volumes, and
- aggregating storage statistics of the data volume granularity to a consumer granularity using an association of data volumes to the consumers.

6. The computer-implemented method of claim 1, further comprising aggregating storage statistics for a plurality of data volumes and consumers by:
- configuring a storage system to maintain storage statistics on a storage device granularity,
- defining a storage device to be dedicated to a single data volume,
- aggregating storage statistics of the storage device granularity to a data volume granularity using an association of storage devices to data volumes, and
- aggregating storage statistics of the data volume granularity to a consumer granularity using an association of data volumes to consumers.

7. The computer-implemented method of claim 1, further comprising:
- aggregating storage statistics for a plurality of data volumes and consumers by:
- configuring a storage system to maintain storage statistics on file or object granularity,
- aggregating storage statistics on the file or object granularity to a data volume granularity using an association of files or objects to data volumes, and
- aggregating storage statistics of the data volume granularity to a consumer granularity using an association of data volumes to the consumers;
- determining a current free capacity for the consumer in response to determining that the storage capacity attribute for the consumer is set to a limited value, wherein the current free capacity is determined by subtracting from the limited value a storage capacity of a plurality of child consumers of a consumer within the hierarchy of consumers as well as sizes of a plurality of data volumes defined for the consumer;
- associating with the consumer a list of user accounts and user groups with associated access permissions for data volumes, where the access permissions allow authenticated access to the data volumes, and where descendant consumers of a consumer within the hierarchy of consumers inherit a list of user accounts and user groups with the associated access permissions associated with the consumer or inherited from ancestor consumers of the consumer; and
- calculating and reporting storage statistics for the data volume, where the storage statistics are translated from different types into a uniform scale, and are presented using one or more sliding time windows of various resolutions,
- wherein access to data volumes assigned to the consumer, parents of the consumer within the hierarchical consumer tree, and a root consumer within the hierarchical consumer tree is provided to the one or more associated applications.

8. The computer-implemented method of claim 1, further comprising determining a current free capacity for the consumer in response to determining that the storage capacity attribute for the consumer is set to a limited value, wherein the current free capacity is determined by subtracting from the limited value a storage capacity of a plurality of child consumers of a consumer within the hierarchy of consumers as well as sizes of a plurality of data volumes defined for the consumer.

9. The computer-implemented method of claim 8, further comprising maintaining the current free capacity for the consumer as a non-negative number.

10. The computer-implemented method of claim 1, further comprising associating with the consumer a list of user accounts and user groups with associated access permissions for data volumes, where the access permissions allow authenticated access to the data volumes.

11. The computer-implemented method of claim 10, wherein descendant consumers of a consumer within the hierarchy of consumers inherit a list of user accounts and user groups with the associated access permissions associated with the consumer or inherited from ancestor consumers of the consumer.

12. The computer-implemented method of claim 1, further comprising calculating and reporting storage statistics for the data volume.

13. The computer-implemented method of claim 12, wherein the storage statistics are translated from different types into a uniform scale, and are presented using one or more sliding time windows of various resolutions.

14. A computer program product for managing storage attributes in association with a consumer, the computer program product comprising a computer readable storage medium having program instructions embodied therewith, wherein the computer readable storage medium is not a transitory signal per se, the program instructions executable by a processor to cause the processor to perform a method comprising:

identifying, utilizing the processor, a request to create a consumer within a converged system;

defining, utilizing the processor, the consumer within a hierarchy of consumers, where:

the consumer represents a unit within an organization that receives computing and storage resources assigned to the consumer through the converged system, the consumer has one or more associated applications that are run within the converged system, the consumer has a set of attributes that control a way by which the computing and storage resources are made available to the consumer and its associated applications, and the hierarchy of consumers includes a hierarchical consumer tree that allows for resource inheritance;

setting, utilizing the processor, the set of attributes, including a storage capacity attribute, for the consumer, including:

assigning the storage capacity attribute a disabled value, utilizing the processor, in response to determining that a storage capacity mechanism is not applied to the consumer, assigning the storage capacity attribute an unlimited value, utilizing the processor, in response to determining that there is no limit to a storage capacity associated with the associated consumer, and assigning the storage capacity attribute a limited value, utilizing the processor, in response to determining that a positive value storage capacity limit is assigned to the consumer, the limited value indicating an upper bound on storage allocated to the consumer, assigning the storage capacity attribute the disabled value during an initialization of the consumer, utilizing the processor, assigning the storage capacity attribute the unlimited value or the limited value in response to determining that a parent node of the consumer within the hierarchical consumer tree has a capacity attribute that is different than disabled, utilizing the processor, and assigning the storage capacity attribute the unlimited value or the limited value in response to determining that the consumer is a root node within the hierarchical consumer tree, utilizing the processor; and conditionally providing access to a data volume to the one or more associated applications, utilizing the processor, based at least in part on the storage capacity attribute.

15. The computer program product of claim 14, further comprising referencing the data volume by an application assigned to the consumer, utilizing the processor.

16. The computer program product of claim 14, further comprising referencing, by an application assigned to the consumer, another data volume that is assigned to an ancestor consumer of a consumer within the hierarchy of consumers, utilizing the processor.

17. A system, comprising:

a hardware processor; and logic integrated with the hardware processor, executable by the hardware processor, or integrated with and executable by the hardware processor, the logic being configured to:

identify a request to create a consumer within a converged system;

define the consumer within a hierarchy of consumers, where:

the consumer represents a unit within an organization that receives computing and storage resources assigned to the consumer through the converged system, the consumer has one or more associated applications that are run within the converged system, the consumer has a set of attributes that control a way by which the computing and storage resources are made available to the consumer and its associated applications, and the hierarchy of consumers includes a hierarchical consumer tree that allows for resource inheritance;

set the set of attributes, including a storage capacity attribute, for the consumer, including:

assigning the storage capacity attribute a disabled value in response to determining that a storage capacity mechanism is not applied to the consumer, assigning the storage capacity attribute an unlimited value in response to determining that there is no limit to a storage capacity associated with the associated consumer, and assigning the storage capacity attribute a limited value in response to determining that a positive value storage capacity limit is assigned to the consumer, the limited value indicating an upper bound on storage allocated to the consumer, assigning the storage capacity attribute the disabled value during an initialization of the consumer, assigning the storage capacity attribute the unlimited value or the limited value in response to determining that a parent node of the consumer within the hierarchical consumer tree has a capacity attribute that is different than disabled, and assigning the storage capacity attribute the unlimited value or the limited value in response to determining that the consumer is a root node within the hierarchical consumer tree; and conditionally provide access to a data volume to the one or more associated applications, based at least in part on the storage capacity attribute.

* * * * *